United States Patent
Pica et al.

(10) Patent No.: US 9,615,321 B2
(45) Date of Patent: Apr. 4, 2017

(54) APPARATUS AND METHODS FOR FACILITATING CELL RESELECTION FOR HIGHER PRIORITY LAYERS

(75) Inventors: Francesco Pica, San Diego, CA (US); Heechoon Lee, San Diego, CA (US); Sharad Deepak Sambhwani, San Diego, CA (US); Uzma Khan, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 13/454,512

(22) Filed: Apr. 24, 2012

(65) Prior Publication Data

US 2012/0329462 A1 Dec. 27, 2012

Related U.S. Application Data

(60) Provisional application No. 61/499,668, filed on Jun. 21, 2011.

(51) Int. Cl.
H04W 48/16 (2009.01)
H04W 48/20 (2009.01)
H04W 76/04 (2009.01)

(52) U.S. Cl.
CPC .......... *H04W 48/20* (2013.01); *H04W 76/046* (2013.01); *H04W 76/048* (2013.01)

(58) Field of Classification Search
CPC ..... H04W 48/18; H04W 8/005; H04W 36/04; H04W 36/08; H04W 36/16; H04W 36/34

(Continued)

(56) References Cited

U.S. PATENT DOCUMENTS 7,110,765 B2    9/2006 Amerga et al.
2008/0057948 A1* 3/2008 Mittal et al. ............... 455/426.1

(Continued)

FOREIGN PATENT DOCUMENTS

CN    101690323 A    3/2010
JP    2010527178 A    8/2010

(Continued)

OTHER PUBLICATIONS

"3rd Generation Partnership Project; Technical Specification Group Radio Access Network; Requirements for support of radio resource management (FDD) (Release 10); Excerpt ps. 1, 15, 19-25, 35", Apr. 12, 2011 (Apr. 12, 2011, 3GPP Standard; 3GPP TS 25.133, V10.1.0, pp. 1-254, XP002683834, [retrieved on Apr. 12, 2011], paragraph [04.2] paragraph [5.5.2.1].

(Continued)

*Primary Examiner* — Temica M Beamer
*Assistant Examiner* — Dung Lam
(74) *Attorney, Agent, or Firm* — Darren M. Simon (57) ABSTRACT

User Equipments (UEs) can be adapted to enter into a lower RRC state from a higher RRC state, and search for one or more layers of higher priority within a predetermined period of time upon entering into the lower RRC state. According to at least one aspect, this search for one or more layers of higher priority may be performed irrespective of RF quality of a current serving cell. According to at least another aspect, this search for one or more layers of higher priority may be conducted within the predetermined period of time if a wait period has elapsed since the UE camped on the current serving cell. If the wait period has not elapsed since camping on the current serving cell, the search for one or more layers of higher priority may be performed within the predetermined period of time following a duration of the wait period.

29 Claims, 5 Drawing Sheets

(58) Field of Classification Search
USPC .......... 455/435.2, 435.3, 434, 436, 515, 517
See application file for complete search history.

(56) References Cited

U.S. PATENT DOCUMENTS

| | | | |
|---|---|---|---|
| 2009/0088160 A1* | 4/2009 | Pani et al. | 455/436 |
| 2010/0048210 A1* | 2/2010 | Iwamura et al. | 455/436 |
| 2010/0093385 A1 | 4/2010 | Kazmi et al. | |
| 2010/0203892 A1* | 8/2010 | Nagaraja et al. | 455/437 |
| 2010/0330921 A1 | 12/2010 | Kim et al. | |
| 2011/0130141 A1 | 6/2011 | Frost et al. | |
| 2011/0182193 A1 | 7/2011 | Dwyer et al. | |
| 2011/0201279 A1 | 8/2011 | Suzuki et al. | |
| 2011/0207459 A1* | 8/2011 | Ramasamy et al. | 455/436 |

FOREIGN PATENT DOCUMENTS

| | | |
|---|---|---|
| RU | 2316895 C2 | 2/2008 |
| WO | 2004021731 A2 | 3/2004 |
| WO | 20050220474 A1 | 3/2005 |
| WO | 2009038368 A1 | 3/2009 |
| WO | 2010049243 A1 | 5/2010 |

OTHER PUBLICATIONS

"3rd Generation Partnership Project; Technical Specification Group Radio Access Network; User Equipment (UE) procedures in idle mode and procedures for cell reselection in connected mode (Release 9)", 3GPP Standard; 3GPP TS 25.304, No. V9.4.0, Mar. 22, 2011 (Mar. 22, 2011), pp. 1-50, XP050476364, [retrieved on Mar. 22, 2011], paragraph [5 2.6.1.2a].

International Search Report and Written Opinion—PCT/US2012/043364—ISA/EPO—Oct. 2, 2012.

3GPP TS 25.133 V10.2.0 (Jun. 2011), 3rd Generation Partnership Project; Technical Specification Group Radio Access Network; Requirements for support of radio resource management (FDD) (Release 10), pp. 1-261.

* cited by examiner

APPARATUS AND METHODS FOR FACILITATING CELL RESELECTION FOR HIGHER PRIORITY LAYERS

CLAIM OF PRIORITY UNDER 35 U.S.C. §119

The present application for patent claims priority to Provisional Application No. 61/499,668 entitled "Cell Reselection for Higher Priority Layers" filed Jun. 21, 2011, and assigned to the assignee hereof and hereby expressly incorporated by reference herein.

BACKGROUND

Technical Field

The following relates generally to wireless communications, and more specifically to methods and devices for facilitating cell reselection for higher priority layers.

Background

Wireless communication networks are widely deployed to provide various communication services such as telephony, video, data, messaging, broadcasts, and so on. Such networks can be multiple-access networks that are capable of supporting communication for multiple wireless terminals by sharing available network resources. Examples of such multiple-access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks.

As wireless terminals operate within various wireless communication networks, the wireless terminals may switch among two or more different cells in a network. In some instances, the switch from one cell to another cell can be dictated according to various metric thresholds and/or levels of priority. For instance, a wireless terminal may reselect to a new cell from a previous cell because the new cell is of a higher priority than the previous cell. Such cell selection and reselection procedures can facilitate and even improve operational efficiency of wireless terminals in a wireless communication network, although cell selection and reselection procedures can also be burdensome on the battery life of a wireless terminal in some instances. Accordingly, advancements in cell selection and reselection procedures may be beneficial for improving the operational efficiency of wireless terminals within wireless communication networks and/or for improving power conservation in wireless terminals.

SUMMARY

Various examples and implementations of the present disclosure may relate to improving cell selection and reselection procedures for improving operational efficiency of devices operating in a wireless communication network and/or for improving power conservation of such devices. According to at least one aspect, user equipments (UEs) are provided. In at least some examples, such UEs may include a processing circuit coupled with a storage medium and a communications interface adapted to facilitate wireless communications. The processing circuit may be adapted to enter into a lower radio resource control (RRC) state from a higher RRC state. The processing circuit may further search for one or more layers of higher priority within a predetermined period of time upon entering into the lower RRC state, irrespective of an RF quality of a current serving cell.

Additional aspects provide methods operational on a UE. One or more examples of such methods may include entering into a lower RRC state from a higher RRC state. A search may be conducted for one or more layers of higher priority. This search can be conducted within a predetermined period of time upon entering into the lower RRC state, regardless of an RF quality of a current serving cell. Further aspects provide UEs including means for performing such methods.

Yet additional aspects of the disclosure include machine-readable mediums including instructions operational on a UE. According to one or more examples, such instructions may cause a processor to enter into a lower RRC state from a higher RRC state, and search for one or more layers of higher priority within a predetermined period of time upon entering into the lower RRC state, independent of an RF quality of a current serving cell.

According to at least one other aspect of the present disclosure, UEs are provided, which include a processing circuit coupled with a storage medium and a communications interface adapted to facilitate wireless communications. The processing circuit may be adapted to camp on a current serving cell, and enter into a lower RRC state from a higher RRC state. If a wait period has elapsed since camping on the current serving cell, the processing circuit may search for one or more layers of higher priority within a predetermined period of time upon entering into the lower RRC state. If the wait period has not elapsed since camping on the current serving cell, the processing circuit may search for one or more layers of higher priority within the predetermined period of time following a duration of the wait period.

Further aspects include methods operational on a UE and/or UEs including means for performing such methods. One or more examples of such methods can include camping on a current serving cell. A lower RRC state may be entered into from a higher RRC state. If a wait period has elapsed since camping on the current serving cell, a search for one or more layers of higher priority may be conducted within a predetermined period of time upon entering into the lower RRC state. If the wait period has not elapsed since camping on the current serving cell, a search for one or more layers of higher priority may be conducted within the predetermined period of time following a duration of the wait period.

Still additional aspects provide machine-readable mediums comprising instructions operational on a UE. According to one or more examples, such instructions may cause a processor to camp on a current serving cell. The instructions may further cause the processor to enter into a lower RRC state from a higher RRC state. If a wait period has elapsed since camping on the current serving cell, the instructions may cause the processor to search for one or more layers of higher priority within a predetermined period of time upon entering into the lower RRC state. If the wait period has not elapsed since camping on the current serving cell, the instructions may cause the processor to search for one or more layers of higher priority within the predetermined period of time following a duration of the wait period.

DETAILED DESCRIPTION

In the following description, specific details are given to provide a thorough understanding of the described concepts. However, it will be understood by those of ordinary skill in the art that the various concepts described herein may be practiced without these specific details. In some instances, well-known circuits, structures, components and techniques may be shown in block diagram form in order not to obscure the described concepts and features.

The various concepts presented throughout this disclosure may be implemented across a broad variety of telecommunication systems, network architectures, and communication standards. For example, the concepts described herein may be employed is wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. A UTRA network (UTRAN) includes Wideband-CDMA (W-CDMA) and Low Chip Rate (LCR). CDMA2000 covers IS-2000, IS-95 and IS-856 standards, and may include Evolution-Data Optimized (EV-DO) or Ultra Mobile Broadband (UMB) air interface standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, FlashOFDM®, etc. UTRA, E-UTRA, and GSM are part of Universal Mobile Telecommunication System (UMTS). Long Term Evolution (LTE) is an improved release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. By way of example and not by way of limitation, certain aspects of the disclosure are described below for UMTS and LTE, and UMTS/LTE terminology may be found in much of the description below.

Figure 1:
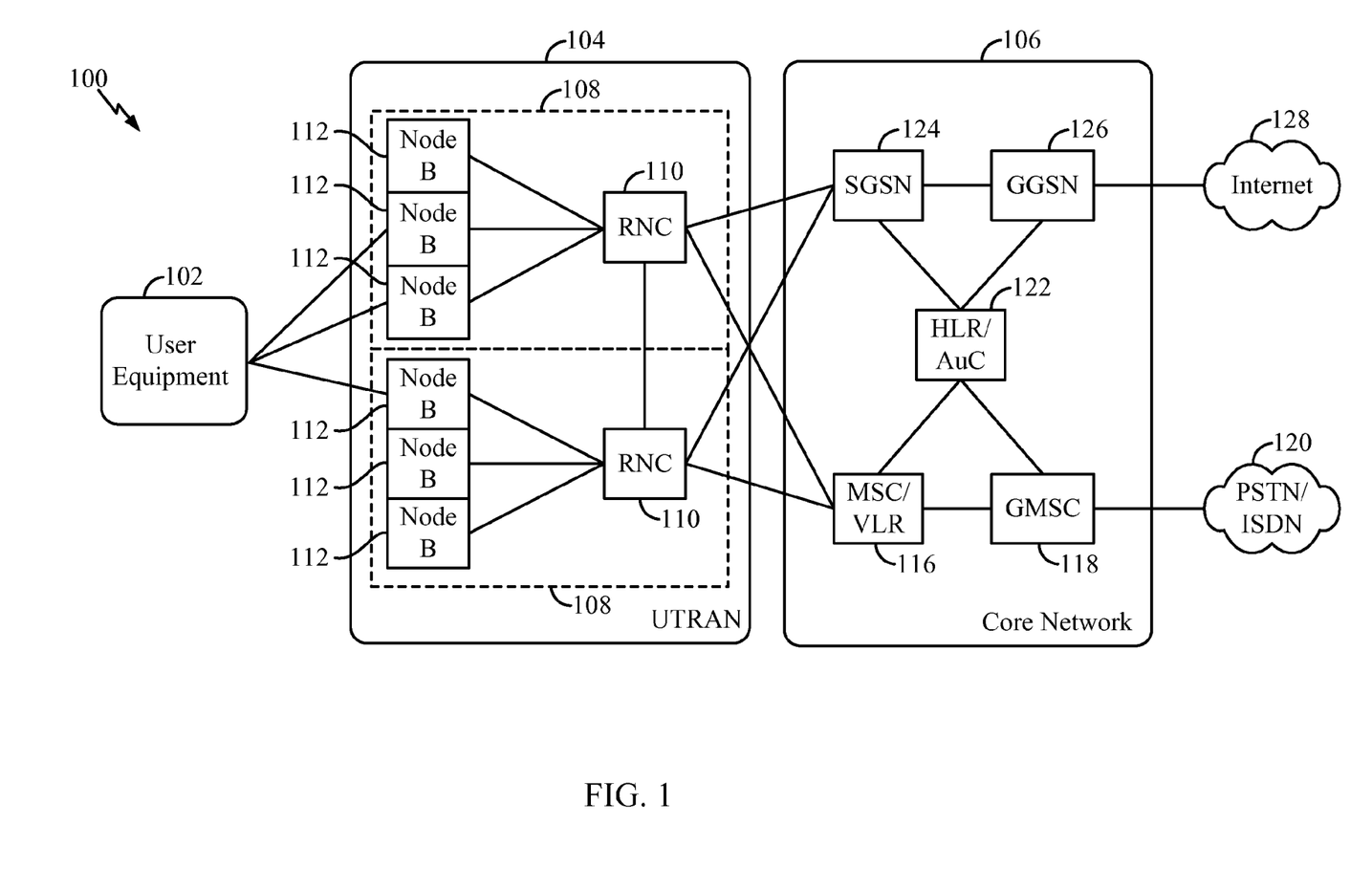
FIG. 1 is a block diagram depicting select components of a wireless communication system according to at least one example of the present disclosure.

FIG. 1 is a block diagram depicting select components of a wireless communication system 100 according to at least one example of a UMTS system employing a W-CDMA air interface. The wireless communication system 100 generally includes a User Equipment (UE) 102, a UMTS Terrestrial Radio Access Network (UTRAN) 104, and a Core Network (CN) 106 that are adapted to interact with each other.

A user equipment (UE) 102 generally includes a device that communicates with one or more other devices through wireless signals. A UE 102 may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Some non-limiting examples of UEs 102 include mobile phones, pagers, wireless modems, personal digital assistants (PDAs), personal information managers (PIMs), personal media players, palmtop computers, laptop computers, tablet computers, televisions, appliances, e-readers, digital video recorders (DVRs), and/or other communication/computing devices which communicate, at least partially, through a wireless or cellular network. One or more UEs 102 can communicate with a wireless network through the UTRAN 104.

The UTRAN 104 is generally adapted to provide various wireless services including telephony, video, data, messaging, broadcasts, and/or other services. The UTRAN 104 may include a plurality of Radio Network Subsystems (RNSs) 108, each controlled by a respective Radio Network Controller (RNC) 110. Here, the UTRAN 104 may include any number of RNCs 110 and RNSs 108 in addition to the RNCs 110 and RNSs 108 illustrated herein. The RNC 110 is generally adapted for, among other things, assigning, reconfiguring and releasing radio resources within the RNS 108. The RNC 110 may be interconnected to other RNCs (not shown) in the UTRAN 104 through various types of interfaces such as a direct physical connection, a virtual network, or the like, using any suitable transport network.

The geographic region covered by each RNS 108 may be divided into a number of cells (e.g., cells 202 in FIG. 2), with a radio transceiver apparatus serving each cell. A radio transceiver apparatus is commonly referred to as a Node B 112 in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 112 are shown in each RNS 108. However, the RNSs 108 may include any number of wireless Node Bs 112. The Node Bs 112 provide wireless access points to the core network (CN) 106 for any number of UEs 102. Communication between a UE 102 and a Node B 112 may be considered as including a physical (PHY) layer and a medium access control (MAC) layer. Further, communication between a UE 102 and an RNC 110 by way of a respective Node B 112 may be considered as including a radio resource control (RRC) layer. In the instant specification, the PHY layer may be considered layer 1, the MAC layer may be considered layer 2, and the RRC layer may be considered layer 3. Information described in this disclosure utilizes terminology introduced in Radio Resource Control (RRC) Protocol Specification, 3GPP TS 25.331 v9.1.0, incorporated herein by reference.

For illustrative purposes, one UE 102 is shown in communication with a number of the Node Bs 112. The downlink (DL), also called the forward link, refers to the wireless communication link from a Node B 112 to a UE 102, and the uplink (UL), also called the reverse link, refers to the wireless communication link from a UE 102 to a Node B 112.

The core network 106 interfaces with one or more access networks, such as the UTRAN 104. The core network 106 includes a circuit-switched (CS) domain and a packet-switched (PS) domain. Some of the circuit-switched elements are a Mobile services Switching Center (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 106 supports circuit-switched services with a MSC 116 and a GMSC 118. In some applications, the GMSC 118 may be referred to as a media gateway (MGW). One or more RNCs, such as the RNC 110, may be connected to the MSC 116. The MSC 116 is an apparatus that controls call setup, call routing, and UE mobility functions. The MSC 116 also includes a visitor location register (VLR) that contains subscriber-related information for the duration that a UE 102 is in the coverage area of the MSC 116. The GMSC 118 provides a gateway through the MSC 116 for the UE 102 to access a circuit-switched network 120.

The core network 106 includes a home location register (HLR) 122 containing subscriber data, such as the data reflecting the details of the services to which a particular user has subscribed. The HLR 122 is also associated with an authentication center (AuC) that contains subscriber-specific authentication data. When a call is received for a particular UE 102, the GMSC 118 queries the HLR 122 to determine the UE's 102 location and forwards the call to the particular MSC 116 serving that location.

The core network 106 also supports packet-data services with a serving GPRS support node (SGSN) 124 and a gateway GPRS support node (GGSN) 126. GPRS, which stands for General Packet Radio Service, is designed to provide packet-data services at speeds higher than those available with standard circuit-switched data services. The GGSN 126 provides a connection for the UTRAN 104 to a packet-based network 128. The packet-based network 128 may be the Internet, a private data network, or some other suitable packet-based network. The primary function of the GGSN 126 is to provide the UEs 102 with packet-based network connectivity. Data packets may be transferred between the GGSN 126 and the UEs 102 through the SGSN 124, which performs primarily the same functions in the packet-based domain as the MSC 116 performs in the circuit-switched domain.

Figure 2:
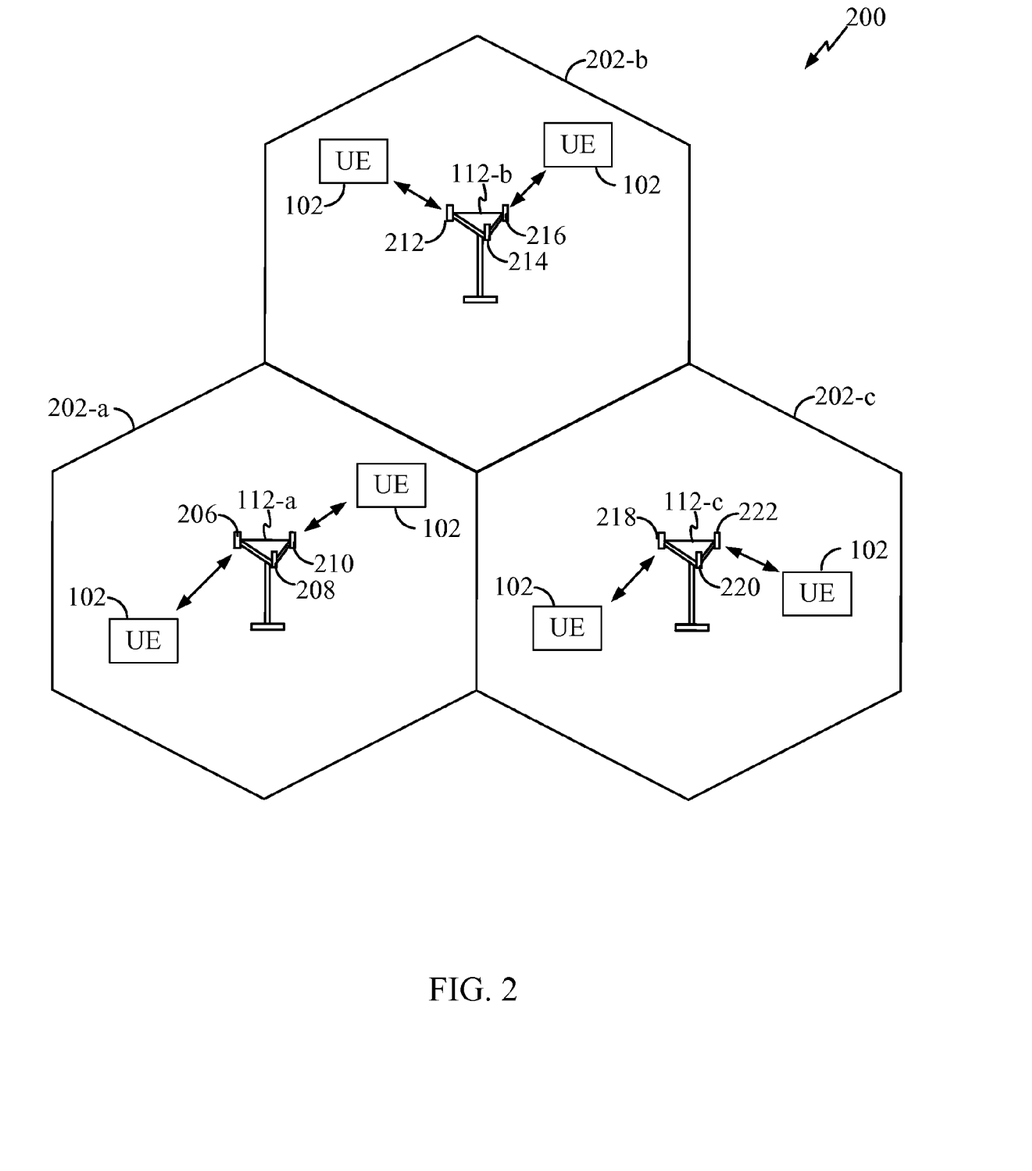
FIG. 2 is a block diagram illustrating at least one example of a network environment in which one or more aspects of the present disclosure may find application.

Turning to FIG. 2, a block diagram is shown illustrating an example of a network environment in which one or more aspects of the present disclosure may find application. The wireless communications network 200 includes multiple cellular regions (cells), including cells 202 (e.g., 202-a, 202-b, and 202-c), each of which may include one or more sectors. The multiple sectors can be formed by groups of antennas with each antenna responsible for communication with one or more wireless communication devices in a portion of the cell 202. For example, in cell 202-a, antenna groups 206, 208, and 210 may each correspond to a different sector. In cell 202-b, antenna groups 212, 214, and 216 each correspond to a different sector. In cell 202-c, antenna groups 218, 220, and 222 each correspond to a different sector.

Each of the cells 202-a, 202-b, and 202-c can include a respective Node B 112-a, 112-b, and 112-c. In the illustrated example, various UEs 102 are in communication with the various Node Bs 112. As noted above, each of the Node Bs 112 (e.g., 112-a, 112-b, 112-c) is adapted to provide an access point to a core network (e.g., core network 106 in FIG. 1) for all the UEs 102 in the respective cells 202-a, 202-b, and 202-c. In some aspects, the UEs 102 may be able to communicate with one or more of the different cells 202-a, 202-b, and 202-c. For example, although not illustrated in FIG. 2, the cells 202-a, 202-b, and 202-c may overlap and may provide different features and/or radio access technologies to the plurality of UEs 102 operating in the wireless communications network 200.

Figure 3:
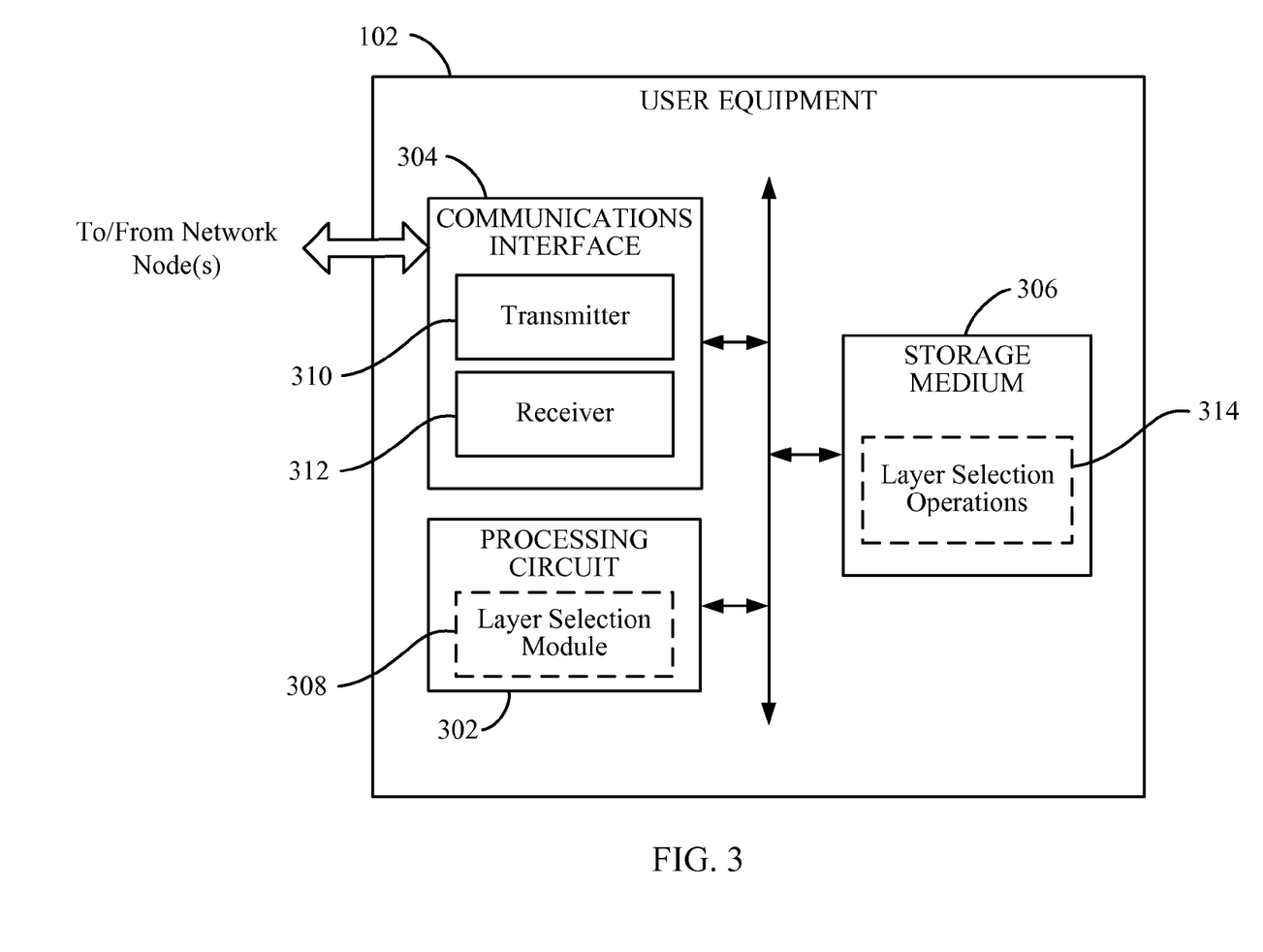
FIG. 3 is a block diagram showing select components of a User Equipment according to at least one example of the present disclosure.

Turning to FIG. 3, a block diagram is shown illustrating select components of such a UE 102 according to at least one example of the present disclosure. The UE 102 may include a processing circuit 302 coupled to a communications interface 304 and to a storage medium 306.

The processing circuit 302 is arranged to obtain, process and/or send data, control data access and storage, issue commands, and control other desired operations. The processing circuit 302 may include circuitry configured to implement desired programming provided by appropriate media in at least one embodiment. For example, the processing circuit 302 may be implemented as one or more of a processor, a controller, a plurality of processors and/or other structure configured to execute executable instructions including, for example, software and/or firmware instructions, and/or hardware circuitry. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 302 are for illustration and other suitable configurations within the scope of the present disclosure are also contemplated.

The processing circuit 302 is adapted for processing, including the execution of programming, which may be stored on the storage medium 306. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. According to at least one example, the processing circuit may include a layer selection module 308. The layer selection module 308 may include circuitry and/or programming adapted to perform the layer selection operations described herein.

The communications interface 304 is configured to facilitate wireless communications of the UE 102. For example, the communications interface 304 may include circuitry and/or programming adapted to facilitate the communication of information bi-directionally with respect to one or more network nodes. The communications interface 304 may be coupled to one or more antennas (not shown), and includes wireless transceiver circuitry, including at least one receiver circuit 310 (e.g., one or more receiver chains) and/or at least one transmitter circuit 312 (e.g., one or more transmitter chains).

The storage medium 306 may represent one or more devices for storing programming and/or data, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor. By way of example and not limitation, the storage medium 306 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof. The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, and may include examples where the storage medium 306 is integral to the processing circuit 302 and examples where the storage medium 306 is separate from the processing circuit 302.

Programming stored by the storage medium 306, when executed by the processing circuit 302, causes the processing circuit 302 to perform one or more of the various functions and/or process steps described herein. The storage medium 306 may include layer selection operations (i.e., instructions) 314. The layer selection operations 314 can be implemented by the processing circuit 302 in, for example, the layer selection module 308. Thus, according to one or more aspects of the present disclosure, the processing circuit 302 may be adapted to perform any or all of the features, processes, functions, steps and/or routines for any or all of the UEs 102 described herein. As used herein, the term "adapted" in relation to the processing circuit 302 may refer to the processing circuit 302 being one or more of configured, employed, implemented, and/or programmed to perform a particular process, function, step and/or routine according to various features described herein.

The processing circuit 302 is adapted to employ various radio resource control (RRC) states as the UE 102 operates in a network (e.g., network 200 in FIG. 2). These radio resource control (RRC) states may include an IDLE state, one or more stand-by states, and one or more connected states. By way of example and not limitation, a stand-by state may include one or more states selected from a group of stand-by states including a URA_PCH state and a CELL_PCH state. By way of another example and not limitation, a connected state may include one or more states selected from a group of connected states including a CELL_DCH state and a CELL_FACH state. The processing circuit 302 can change its RRC state depending on call or connection activity. For instance, the processing circuit 302 may enter into progressively lower states when there is no data for transmission via the communications interface 304 for a sufficient period of time. In one example, the processing circuit 302 may go from a CELL_DCH or CELL_FACH state to one of, or progressively through, several of the intermediate levels of stand-by states (e.g., CELL_PCH, URA_PCH), and/or to an IDLE state. The stand-by states provide for various trade-offs between factors such as network capacity, call set-up times, battery time, and data speeds. The IDLE state saves battery power but provides little wireless connectivity. The stand-by states (e.g., CELL_PCH, URA_PCH) and IDLE state are lower activity states with respect to the connected states (e.g., CELL_DCH, CELL_FACH), and may include examples of lower states as referred to within the present disclosure, while the connected state may include an example of a higher state as referred to within the disclosure.

The $3^{rd}$ Generation Partnership Project (3GPP) is an international consortium responsible for the definition and maintenance of next generation wireless systems that evolve from the second generation GSM wireless system. In one aspect, the 3GPP standards specification TS 25.133 describes the requirements for radio resource management, largely related to specifying when and how measurements are made of the wireless channels. Many such measurements made by the processing circuit 302 via the communications interface 304 can be relatively battery-intensive if carried out too often.

Recent versions of this standards specification TS 25.133, the entire disclosure of which is incorporated herein by reference, provide that whenever the processing circuit 302 changes from a connected state (e.g., CELL_DCH, CELL_FACH) to a lower state (e.g., IDLE state, CELL_PCH, URA_PCH), the processing circuit 302 shall start a search for any higher priority layers within one discontinuous reception (DRX) cycle if the RF quality of the serving cell is greater than a pre-determined threshold. For instance, if the processing circuit 302 changes from a connected state (e.g., CELL_DCH, CELL_FACH) to one of the intermediate levels of stand-by states (e.g., CELL_PCH, URA_PCH) or to the IDLE state, the standards specification dictates that the processing circuit 302 shall start a search for any higher priority layers within one discontinuous reception (DRX) cycle if $Srxlev_{ServingCell}$ is greater than $S_{prioritysearch1}$ and if $Squal_{ServingCell}$ is greater than $S_{prioritysearch2}$. Srxlev and Squal generally refer to the RF quality of the serving cell. "S" refers to the suitability of the cell. Srxlev relates to the received signal code power (RSCP) from the cell, and Squal relates to the $E_c/I_0$ of the cell. $S_{prioritysearch1}$ and $S_{prioritysearch2}$ are pre-determined threshold values.

As used herein, a higher priority layer can refer to a carrier frequency and/or radio access technology (RAT) that may be preferable for serving the UE 102. By way of example and not limitation, a higher priority layer may include one or more higher priority UTRA inter-frequency cells (or UTRA FDD layers of higher priority), one or more GSM broadcast control channel (BCCH) carriers of higher priority, E-UTRA cells of higher priority, or one or more other higher priority layers, as well as combinations thereof. In one illustrative example of higher priority layer corresponding to UTRA inter-frequency cells, it may occur that the UE 102 is at a location served by two different UTRA cells at different frequencies. This can occur, for example, in a network such as the AT&T network within the United States of America, where service might be available in the 850 MHz band and the 1900 MHz band. In general, the 850 MHz band provides better coverage and better performance over the 1900 MHz band, and may represent a higher priority layer over the 1900 MHz band. Thus, according to the 3GPP specification TS 25.133, whenever the processing circuit 302 goes into IDLE state or a stand-by state (e.g., CELL_PCH, URA_PCH), from a connected state (e.g., CELL_DCH, CELL_FACH), the processing circuit 302 will conduct a search for higher priority layers within one DRX cycle. If a higher priority layer is found (e.g., the 850 MHz layer), the processing circuit 302 reselects to the higher-priority layer (e.g., to the 850 MHz layer from the 1900 MHz layer). As noted, higher priority layers may additionally or alternatively include different radio access technologies (RAT). For example, a higher priority layer may be an E-UTRA cell for LTE, or a GSM cell.

This feature of searching for higher priority layers within a predetermined period of time (e.g., one discontinuous reception (DRX) cycle) after entering a lower state can be beneficial at least in cases where the processing circuit 302 may be changing relatively quickly between states. For example, the processing circuit 302 may transmit a few bytes via the communication interface 304 while in a connected state, then is inactive for a period and transitions to a stand-by or IDLE state, followed by a few more bytes to send so that the processing circuit 302 switches back to a connected state, then back to a stand-by or IDLE state, etc. In such a scenario, the processing circuit 302 may not have sufficient time to complete the required search for higher priority layers on entering a stand-by or IDLE state, and may never switch over to the higher priority layer. However, since the processing circuit 302 searches for any higher priority layers relatively quickly (e.g., within one discontinuous reception (DRX) cycle) after entering a lower state, the processing circuit 302 is more likely to complete a search, identify higher priority layers, and switch to such higher priority layers before new data is available to send.

According to at least one aspect of the present disclosure, the processing circuit 302 can be adapted to perform a search for higher priority layers within a predetermined period of time upon entering a lower RRC state from a higher RRC state, irrespective of the RF quality of the serving cell. In at least one example, the predetermined period of time can be one discontinuous reception cycle (DRX), such that the processing circuit 302 is adapted to search for one or more higher priority layers within one discontinuous reception cycle (DRX) cycle since entering the lower RRC state, regardless of the RF quality of the serving cell.

Figure 4:
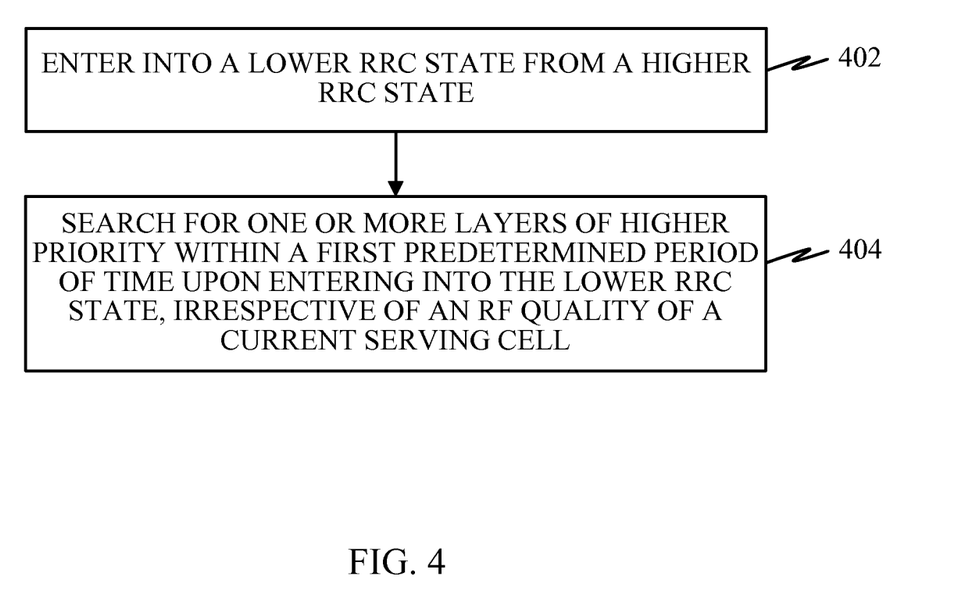
FIG. 4 is a flow diagram illustrating a method operational on a User Equipment according to at least one implementation.

Turning to FIG. 4, a flow diagram is shown illustrating a method operational on a UE, such as UE 102, according to at least one example. With reference to both of FIGS. 3 and 4, a UE 102 can enter into a lower RRC state from a higher RRC state at step 402. For example, the processing circuit 302 may change from a higher RRC state to a lower RRC state. In at least one example, the processing circuit 302 may enter into a lower RRC state when the processing circuit 302 enters into a stand-by state (e.g., CELL_PCH, URA_PCH) or an IDLE state when the higher RRC state was a state other than a stand-by state or an IDLE state (e.g., if the higher RRC state is a connected state, such as CELL_DCH, or CELL_FACH). For instance, the processing circuit 302 may enter into a lower RRC state by entering into one of a CELL_PCH state, a URA_PCH state, or an IDLE state when the processing circuit 302 was not previously in any of these states.

At step 404, the UE 102 searches for one or more layers of higher priority within a predetermined period of time upon entering into the lower RRC state, irrespective of an RF quality of a current serving cell. For example, the processing circuit 302 (e.g., the layer selection module 308) implementing the layer selection operations 314 can conduct a search for one or more higher priority layers in response to entering the lower RRC state, where the search is conducted within the predetermined period of time from when the processing circuit 302 entered into the lower RRC state. In one non-limiting example, the processing circuit 302 (e.g., the layer selection module 308) implementing the layer selection operations 314 initiates the search for higher priority layers within one discontinuous reception (DRX) cycle upon entering into the lower RRC state. The search for higher priority layers may include the processing circuit 302 obtaining data (e.g., taking measurements, identifying availability of cells, etc.) relating to one or more higher priority layers via the communications interface 304.

Instead of initially determining whether the RF quality of the current serving cell is above some predetermined threshold(s), the processing circuit 302 (e.g., the layer selection module 308) implementing the layer selection operations 314 conducts the search for the one or more layers of higher priority without regard for and independent of the RF quality of the current serving cell. For instance, the processing circuit 302 (e.g., the layer selection module 308) implementing the layer selection operations 314 conducts the search for one or more higher priority layers within the predetermined period of time, irrespective of the values for $Srxlev_{ServingCell}$ and $Squal_{ServingCell}$. In other words, a search for higher priority layers can be conducted within the predetermined time period, irrespective of the values for received signal code power (RSCP) and/or $E_c/I_0$ of the current serving cell. Thus, contrary to the current 3GPP standards specification TS 25.133, the processing circuit 302 is adapted to implement a search for one or more higher priority layers within the predetermined period of time (e.g., one discontinuous reception (DRX) cycle), even if the value for $Srxlev_{ServingCell}$ is less than or equal to $S_{prioritysearch1}$ and/or if $Squal_{ServingCell}$ is less than or equal to $S_{prioritysearch2}$.

Figure 5:
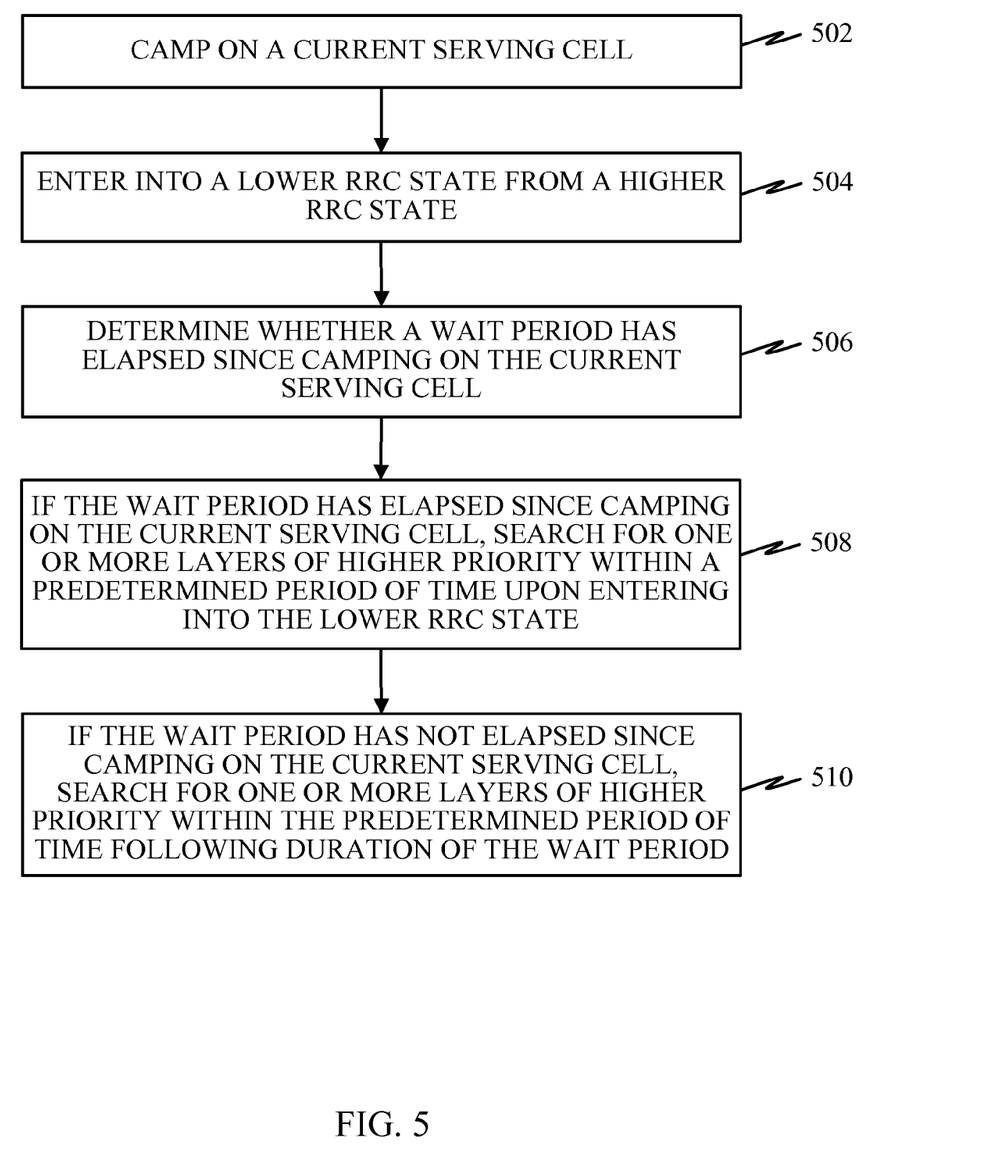
FIG. 5 is a flow diagram illustrating at least one example of a method operational on a User Equipment.

According to at least one additional or alternative aspect of the present disclosure, the processing circuit 302 can be adapted to delay in performing a search for higher priority layers if the UE 102 has not been camped on the current serving cell for a predefined threshold amount of time. FIG. 5 is a flow diagram illustrating at least one example of such a method operational on a UE, such as the UE 102.

Referring to both of FIGS. 3 and 5, a UE 102 can camp on a current serving cell at step 502. For example, the processing circuit 302 can cause the UE 102 to camp on a current serving cell. Such a process of camping on the current serving cell may be a result of a cell reselection procedure performed by the processing circuit 302. A cell reselection refers to the process where the processing circuit 302 chooses a new cell to camp on after the UE 102 has already registered and is camped on previous cell. At least some aspects of cell reselection procedures are described in the 3GPP standards specification TS 25.304, the entire disclosure of which is incorporated herein by this reference.

At step 504, the UE 102 may enter into a lower RRC state from a higher RRC state. For example, the processing circuit 302 may change from a higher RRC state to a lower RRC state. In at least one example, the processing circuit 302 may enter into a lower RRC state when the processing circuit 302 enters into a stand-by state (e.g., CELL_PCH, URA_PCH) or an IDLE state from a state other than a stand-by state or an IDLE state (e.g., if the higher RRC state is a connected state, such as CELL_DCH, or CELL_FACH). For instance, the processing circuit 302 may enter into a lower RRC state by entering into one of a CELL_PCH state, a URA_PCH state, or an IDLE state when the processing circuit 302 was not previously in any of these three states.

At step 506, the UE 102 determines whether a wait period has elapsed since camping on the current serving cell. For example, the processing circuit 302 (e.g., the layer selection module 308) implementing the layer selection operations 314 can identify whether the wait period has elapsed since camping on the current serving cell.

In at least some examples, the wait period may be equal to a delay period associated with cell reselection. In some instances, it can be beneficial for the processing circuit 302 to delay in performing a cell reselection to a new cell when the UE 102 has been camped on the current serving cell for less than a predefined threshold. In other words, when the UE 102 initially camps on a current serving cell, the processing circuit 302 can be adapted to abstain from reselecting to a new cell until a predefined wait period has passed. According to at least one example described in the standards specification TS 25.304, this delay period for cell reselection can be set as one (1) second. Thus, when the UE 102 is adapted to operate according to this standards specification TS 25.304, the processing circuit 302 will wait for duration of at least one (1) second after the UE 102 camps on the current serving cell before conducting a cell reselection procedure. In examples where the wait period is equal to the delay period and the delay period is defined by the standards specification TS 25.304, the processing circuit 302 (e.g., the layer selection module 308) implementing the layer selection operations 314 will also wait at least one (1) second after the UE 102 camps on the current serving cell before conducting a search for higher priority layers, as set forth below.

Accordingly, at step 508, if the wait period has elapsed since camping on the current serving cell, the UE 102 can search for one or more layers of higher priority within a predetermined period of time upon entering into the lower RRC state at step 504. For example, the processing circuit 302 (e.g., the layer selection module 308) implementing the layer selection operations 314 can conduct a search for one or more higher priority layers in response to entering the lower RRC state, where the search is conducted within the predetermined period of time from when the processing circuit 302 entered into the lower RRC state. In one non-limiting example, the processing circuit 302 (e.g., the layer selection module 308) implementing the layer selection operations 314 initiates the search for higher priority layers within one discontinuous reception (DRX) cycle upon entering into the lower RRC state.

At step 510, if the wait period has not elapsed since camping on the current serving cell, the UE 102 can search for the one or more layers of higher priority within the predetermined period of time following duration of the wait period. For example, the processing circuit 302 (e.g., the layer selection module 308) implementing the layer selection operations 314 can conduct a search for one or more higher priority layers in response to entering the lower RRC state, where the search is conducted within the predetermined period of time from when the wait period has elapsed. In one non-limiting example, the processing circuit 302 (e.g., the layer selection module 308) implementing the layer selection operations 314 initiates the search for one or more higher priority layers within one discontinuous reception (DRX) cycle following a duration of the wait period.

As noted above, the wait period may be equal to a delay period, which may be set as one (1) second according to the standards specification TS 25.304. According to such an example, the processing circuit 302 (e.g., the layer selection module 308) implementing the layer selection operations 314 may search for the one or more higher priority layers within the predetermined period of time upon entering into the lower RRC state plus the wait period (e.g., one (1) second). In another example, the processing circuit 302 (e.g., the layer selection module 308) implementing the layer selection operations 314 may search for the one or more higher priority layers within the predetermined period of time after the wait period (e.g., one (1) second) has elapsed since the processing circuit 302 camped on the current serving cell.

The search for higher priority layers in steps 508 and 510 may include the processing circuit 302 obtaining data (e.g., taking measurements, identifying availability of cells, etc.) relating to one or more higher priority layers via the communications interface 304.

One or more of the components, steps, features and/or functions illustrated in FIGS. 1, 2, 3, 4 and/or 5 may be rearranged and/or combined into a single component, step, feature or function or embodied in several components, steps, or functions. Additional elements, components, steps, and/or functions may also be added without departing from the scope of the present disclosure. The apparatus, devices, and/or components illustrated in FIGS. 1, 2 and/or 3 may be configured to perform one or more of the methods, features, or steps described in FIGS. 4 and/or 5. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the embodiments described herein can be implemented in different systems without departing from the scope of the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A user equipment, comprising:
   a communications interface adapted to facilitate wireless communications;
   a storage medium; and
   a processing circuit coupled with the communications interface and the storage medium, the processing circuit adapted to:
   camp on a current serving cell;
   after starting to camp on the current serving cell and while still camping on the current serving cell, enter into a lower radio resource control (RRC) state from a higher RRC state;
   upon entering into the lower RRC state from the higher RRC state, wait for a duration of a wait period since starting to camp on the current serving cell to elapse prior to searching for one or more layers of higher priority; and
   search for the one or more layers of higher priority, after waiting the duration of the wait period, within a first discontinuous reception (DRX) cycle after entering into the lower RRC state from the higher RRC state, irrespective of a radio frequency (RF) quality of the current serving cell.

2. The user equipment of claim 1, wherein the lower RRC state comprises a stand-by state or an idle state, and the higher RRC state comprises a connected state.

3. The user equipment of claim 1, wherein the lower RRC state comprises one of a CELL_PCH state, a URA_PCH state, or an idle state, and wherein the higher RRC state is a state other than the CELL_PCH state, the URA_PCH state, and the idle state.

4. The user equipment of claim 1, wherein the RF quality of the current serving cell comprises received signal code power (RSCP) and $E_c/I_0$ of the current serving cell.

5. The user equipment of claim 1, wherein the wait period is equal to a delay period during which the processing circuit is adapted to delay before conducting a cell reselection procedure after camping on the current serving cell.

6. A method operational on a user equipment, comprising:
   camping on a current serving cell;
   after starting to camp on the current serving cell and while still camping on the current serving cell, entering into a lower radio resource control (RRC) state from a higher RRC state;
   upon entering into the lower RRC state from the higher RRC state, waiting for a duration of a wait period since starting to camp on the current serving cell to elapse prior to searching for one or more layers of higher priority; and
   searching for the one or more layers of higher priority, after waiting the duration of the wait period, within a first discontinuous reception (DRX) cycle after entering into the lower RRC state from the higher RRC state, regardless of a radio frequency (RF) quality of the current serving cell.

7. The method of claim 6, wherein entering into a lower RRC state from a higher RRC state comprises:
   entering into a stand-by state or an idle state from a connected state.

8. The method of claim 6, wherein entering into a lower RRC state from a higher RRC state comprises:
   entering into one of a CELL_PCH state, a URA_PCH state, or an idle state from an RRC state other than the CELL_PCH state, the URA_PCH state, and the idle state.

9. The method of claim 6, wherein searching for one or more layers of higher priority after waiting the duration of the wait period, regardless of an RF quality of a current serving cell comprises:
   searching for the one or more layers of higher priority within a first DRX cycle after waiting the duration of the wait period, regardless of respective values for received signal code power (RSCP) and for $E_c/I_0$ of the current serving cell.

10. The method of claim 6, wherein waiting for the duration of the wait period since starting to camp on the current serving cell to elapse comprises:
    waiting for a period of time at least substantially equal to a period of time during which no cell reselection procedure is conducted after camping on the current serving cell.

11. A user equipment, comprising:
    means for camping on a current serving cell;
    means for entering, after starting to camp on the current serving cell and while still camping on the current serving cell, into a lower radio resource control (RRC) state from a higher RRC state;
    means for waiting, upon entering into the lower RRC state from the higher RRC state, for a duration of a wait period since starting to camp on the current serving cell to elapse prior to searching for one or more layers of higher priority; and
    means for searching for the one or more layers of higher priority, after waiting the duration of the wait period, within a first discontinuous reception (DRX) cycle after entering into the lower RRC state from the higher RRC state, irrespective of a radio frequency (RF) quality of the current serving cell.

12. The user equipment of claim 11, wherein the lower RRC state includes a stand-by state or an idle state, and the higher RRC state includes a connected state.

13. The user equipment of claim 11, wherein the lower RRC state comprises one of a CELL_PCH state, a URA_PCH state, or an idle state, and wherein the higher RRC state is a state other than the CELL_PCH state, the URA_PCH state, and the idle state.

14. A non-transitory computer-readable medium comprising code executable by a processor on a user equipment, comprising:
code for camping on a current serving cell;
code for entering, after starting to camp on the current serving cell and while still camping on the current serving cell, into a lower radio resource control (RRC) state from a higher RRC state;
code for waiting, upon entering into the lower RRC state from the higher RRC state, for a duration of a wait period since starting to camp on the current serving cell to elapse before searching for one or more layers of higher priority; and
code for searching for the one or more layers of higher priority, after waiting the duration of the wait period, within a first discontinuous reception (DRX) cycle after entering into the lower RRC state from the higher RRC state, independent of a radio frequency (RF) quality of the current serving cell.

15. The non-transitory machine-readable medium of claim 14, wherein the lower RRC state includes a stand-by state or an idle state, and the higher RRC state includes a connected state.

16. The non-transitory machine-readable medium of claim 14, wherein the lower RRC state comprises one of a CELL_PCH state, a URA_PCH state, or an idle state, and wherein the higher RRC state is a state other than the CELL_PCH state, the URA_PCH state, and the idle state.

17. A user equipment, comprising:
a communications interface adapted to facilitate wireless communications;
a storage medium; and
a processing circuit coupled to the communications interface and the storage medium, the processing circuit adapted to:
camp on a current serving cell;
after starting to camp on the current serving cell and while still camping on the current serving cell, enter into a lower radio resource control (RRC) state from a higher RRC state;
determine whether a wait period has elapsed since starting to camp on the current serving cell;
if the wait period has elapsed since starting to camp on the current serving cell, search for one or more layers of higher priority within a first discontinuous reception (DRX) cycle after entering into the lower RRC state from the higher RRC state; and
if the wait period has not elapsed since starting to camp on the current serving cell, search for one or more layers of higher priority within a second DRX cycle following a duration of the wait period.

18. The user equipment of claim 17, wherein the lower RRC state comprises one of a CELL_PCH state, a URA_PCH state, or an idle state, and wherein the higher RRC state is a state other than the CELL_PCH state, the URA_PCH state, and the idle state.

19. The user equipment of claim 17, wherein the wait period is equal to a delay period during which the processing circuit is adapted to abstain from cell reselection after camping on the current serving cell.

20. The user equipment of claim 17, wherein, if the wait period has not elapsed since starting to camp on the current serving cell, the processing circuit is adapted to:
search for one or more layers of higher priority within the second DRX cycle plus the wait period.

21. The user equipment of claim 17, wherein, if the wait period has not elapsed since starting to camp on the current serving cell, the processing circuit is adapted to:
search for one or more layers of higher priority within the second DRX cycle after the wait period has elapsed since camping on the current serving cell.

22. A method operational on a user equipment, comprising:
camping on a current serving cell;
after starting to camp on the current serving cell and while still camping on the current serving cell, entering into a lower radio resource control (RRC) state from a higher RRC state;
determining whether a wait period has elapsed since starting to camp on the current serving cell;
if the wait period has elapsed since starting to camp on the current serving cell, searching for one or more layers of higher priority within a first discontinuous reception (DRX) cycle after entering into the lower RRC state from the higher RRC state; and
if the wait period has not elapsed since starting to camp on the current serving cell, searching for one or more layers of higher priority within a second DRX cycle following a duration of the wait period.

23. The method of claim 22, wherein entering into a lower RRC state from a higher RRC state comprises:
entering into one of a CELL_PCH state, a URA_PCH state, or an idle state from an RRC state other than the CELL_PCH state, the URA_PCH state, and the idle state.

24. The method of claim 22, wherein searching for one or more layers of higher priority within a second DRX cycle following a duration of the wait period comprises:
searching for one or more layers of higher priority within the second DRX cycle following a duration of delay period during which no cell reselection is performed after camping on the current serving cell.

25. The method of claim 22, wherein searching for one or more layers of higher priority within a second DRX cycle following a duration of the wait period comprises:
searching for one or more layers of higher priority within the second DRX cycle plus the duration of the wait period.

26. The method of claim 22, wherein searching for one or more layers of higher priority within a second DRX cycle following a duration of the wait period comprises:
searching for one or more layers of higher priority within the second DRX cycle after the wait period has elapsed since starting to camp on the current serving cell.

27. A user equipment, comprising:
means for camping on a current serving cell;
means for entering, after starting to camp on the current serving cell and while still camping on the current serving cell, into a lower radio resource control (RRC) state from a higher RRC state;
means for determining whether a wait period has elapsed since starting to camp on the current serving cell;
means for searching for one or more layers of higher priority within a first discontinuous reception (DRX) cycle after entering into the lower RRC state from the higher RRC state, if the wait period has elapsed since starting to camp on the current serving cell; and
means for searching for one or more layers of higher priority within a second DRX cycle following a duration of the wait period, if the wait period has not elapsed since starting to camp on the current serving cell.

28. A non-transitory machine-readable medium comprising instructions operational on an user equipment, which when executed by a processor cause the processor to:
- camp on a current serving cell;
- after starting to camp on the current serving cell and while still camping on the current serving cell, enter into a lower radio resource control (RRC) state from a higher RRC state;
- determining whether a wait period has elapsed since starting to camp on the current serving cell;
- if the wait period has elapsed since starting to camp on the current serving cell, search for one or more layers of higher priority within a first discontinuous reception (DRX) cycle after entering into the lower RRC state from the higher RRC state; and
- if the wait period has not elapsed since starting to camp on the current serving cell, search for one or more layers of higher priority within a second DRX cycle following a duration of the wait period.

29. The method of claim 6, wherein searching for one or more layers of higher priority within a first DRX cycle after entering into the lower RRC state from the higher RRC state comprises searching for the one or more layers of higher priority within the first DRX cycle after entering into the lower RRC state from the higher RRC state, if the received signal code power (RSCP) value of the current serving cell is less than or equal to a first threshold value or if the $E_c/I_0$ value of the current serving cell is less than or equal to a second threshold value.

* * * * *